United States Patent [19]
Chin et al.

[11] Patent Number: 5,315,519
[45] Date of Patent: May 24, 1994

[54] METHOD OF SENSING EXCESSIVE SLIP IN A WHEEL SLIP CONTROL SYSTEM

[75] Inventors: Yuen-Kwok Chin, Troy; Youssef A. Ghoneim, Mt. Clemens, both of Mich.

[73] Assignee: General Motors Corporation, Detroit, Mich.

[21] Appl. No.: 770,269

[22] Filed: Oct. 3, 1991

[51] Int. Cl.⁵ .................... B60K 17/34; B60T 8/04
[52] U.S. Cl. .................... 364/426.02; 364/426.01; 180/147
[58] Field of Search ............ 364/426.02, 426.01, 364/426.03; 180/147; 303/100, 110, 105, 112, 103, 95, 97, 93

[56] References Cited

U.S. PATENT DOCUMENTS

| | | | |
|---|---|---|---|
| 4,711,317 | 12/1987 | Sakakiyama | 180/197 |
| 4,718,735 | 1/1988 | Ogino | 303/93 |
| 4,763,912 | 8/1988 | Matsuda | 180/197 |
| 4,771,850 | 9/1988 | Matsuda | 180/197 |
| 4,932,726 | 6/1990 | Iwata et al. | 303/100 |
| 4,933,856 | 6/1990 | Leiber | 364/426.01 |
| 4,998,782 | 3/1991 | Thatcher et al. | 303/110 |
| 5,002,147 | 3/1991 | Tezuka et al. | 180/197 |
| 5,047,941 | 9/1991 | Seki | 364/426.03 |
| 5,090,510 | 2/1992 | Watanabe et al. | 180/197 |

Primary Examiner—Gary Chin
Assistant Examiner—Julie D. Day
Attorney, Agent, or Firm—Howard N. Conkey

[57] ABSTRACT

The onset of an excessive slip condition in a slip controller is determined so that it is adaptable to the actual drive torque conditions between the driven wheel and the road surface so as to achieve the desired acceleration or braking characteristics for all vehicle driving conditions including while the vehicle is traveling on a curved road surface. At low vehicle speeds, slip control is enabled when the value of a predetermined function of the difference in speeds of the driven and undriven wheels exceeds a threshold that is a function of the vehicle turn radius and at high vehicle speeds when the value of a predetermined function of a wheel slip ratio exceeds the threshold that is a function of the vehicle turn radius. The vehicle speed below which slip control is enabled based on a wheel speed function and above which traction control is enabled based on the wheel slip function increases with an increasing vehicle steering angle.

6 Claims, 8 Drawing Sheets

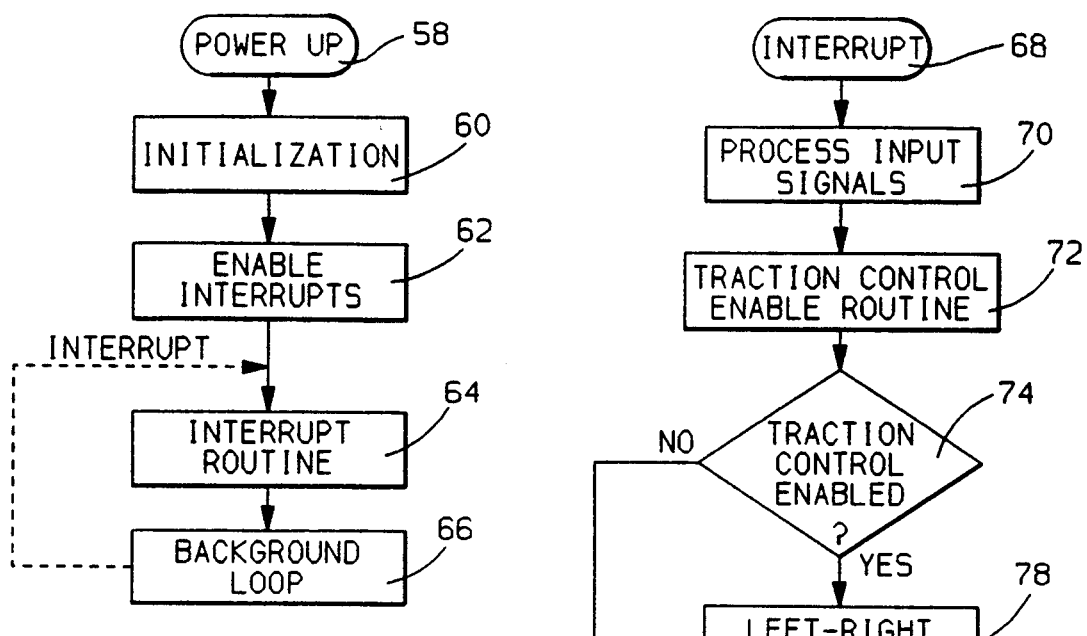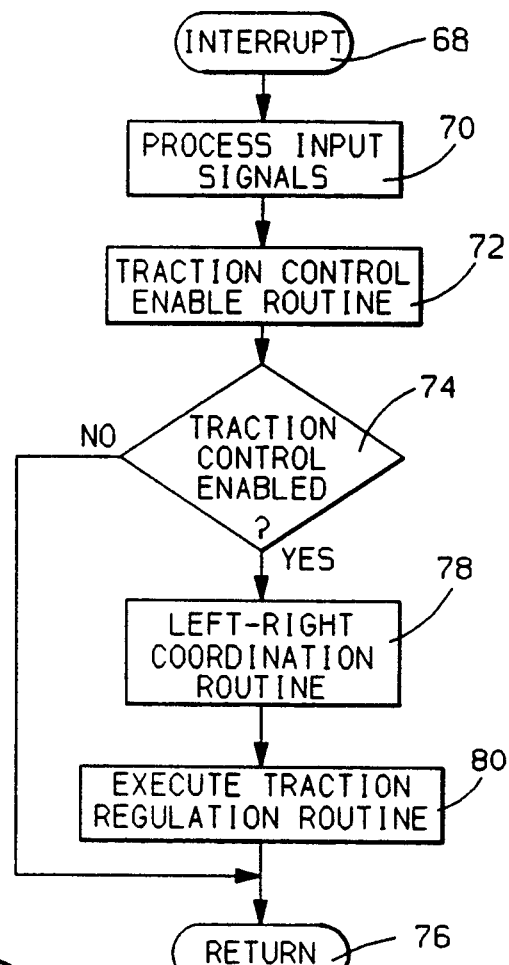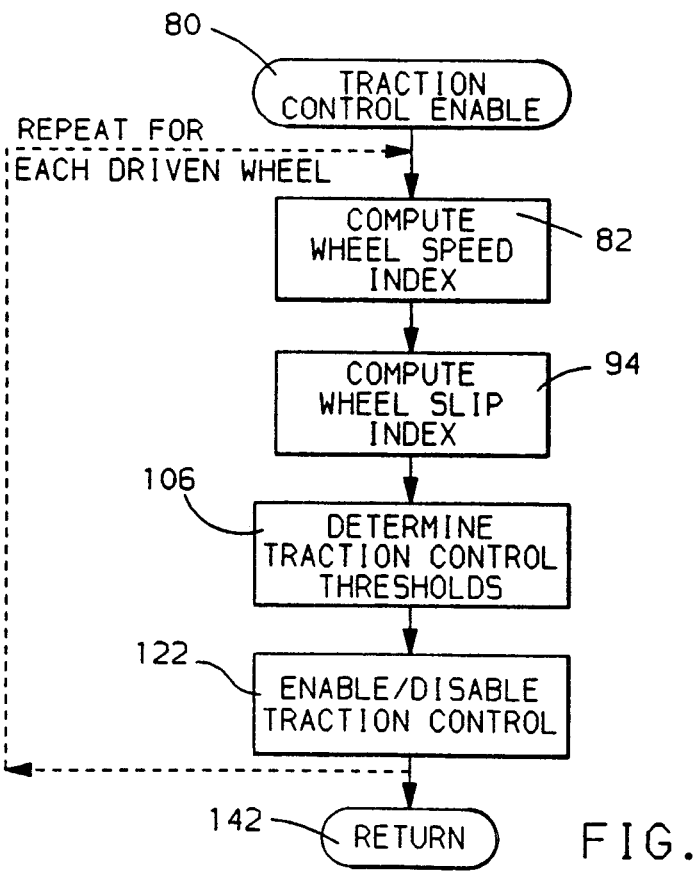
FIG. 2
FIG. 3
FIG. 4

METHOD OF SENSING EXCESSIVE SLIP IN A WHEEL SLIP CONTROL SYSTEM

BACKGROUND OF THE INVENTION

This invention relates to a method of sensing an excessive slip condition for a vehicle slip control system.

When a torque is applied to a vehicle wheel for braking or driving the wheel, a force is generated between the wheel and the road surface tending to decelerate or accelerate the vehicle. This force is dependent upon various parameters, including the road surface conditions and the amount of slip between the wheel and the road surface. As the torque input to the wheel is increased, the force between the tire and the road surface increases as wheel slip increases, until a critical slip value is surpassed. When the slip exceeds this critical slip value, the force between the wheel and the road surface decreases. Further, as wheel slip increases, the lateral forces acting on the slipping wheel decrease.

Various methods have been proposed for preventing this excessive slip condition of the wheels of a vehicle. In the case of acceleration slip, these methods include a traction controller that adjusts engine torque and/or the application of the brakes of the driven wheels when an excessive slip condition is sensed. In the case of vehicle braking, a wheel-lock controller limits brake pressure when an excessive slip condition is sensed. Whatever method is selected for controlling wheel slip, it is an objective of these systems to (a) maximize the longitudinal driving or braking forces and (b) to continuously maintain lateral In order to achieve the foregoing objectives, it is desirable to control entry into traction or anti-lock braking control so as to minimize premature entry to thereby achieve a maximum transfer of force between the wheels and the road surface while at the same time maintaining lateral stability.

SUMMARY OF THE INVENTION

This invention provides for an improved method of sensing an excessive slip condition in a traction or anti-lock braking control system and enabling the system to control slip in response thereto. This method provides for determining the onset of an excessive slip condition that is adaptable to the actual drive torque conditions between the driven wheel and the road surface so as to achieve the desired acceleration or braking characteristics for all vehicle driving conditions including while the vehicle is traveling on a curved road surface. Further, the method of this invention for sensing the onset of an excessive slip condition minimizes premature entry into slip control so as to thereby achieve a desired balance between the transfer of the longitudinal force between the wheels and the road surface and lateral stability of the vehicle while traveling on a curved surface.

In one aspect of the invention, at low vehicle speeds, slip control is enabled when the value of a predetermined function of the difference in speeds of the driven and undriven wheels exceeds a threshold that is a function of the vehicle turn radius and at high vehicle speeds when the value of a predetermined function of a wheel slip ratio exceeds the threshold that is a function of the vehicle turn radius.

In another aspect of the invention, the vehicle speed below which slip control is enabled based on a wheel speed function and above which traction control is enabled based on the wheel slip function increases with an increasing vehicle steering angle.

In another aspect of the invention, the wheel speed threshold is based upon the difference in the driven and undriven wheel speeds on the same side of the vehicle and the rate of change of the difference and the wheel slip threshold is based upon the magnitude of wheel slip and the rate of change in wheel slip.

DESCRIPTION OF THE DRAWINGS

The invention may be best understood by reference to the following description of a preferred embodiment and the drawings in which:

FIGS. 2-15 are flow diagrams illustrating the operation of the traction controller of FIG. 1.

DESCRIPTION OF A PREFERRED EMBODIMENT

The invention is described as applied to a traction control system. However, it is also applicable to anti-lock braking control systems.

Figure 1:
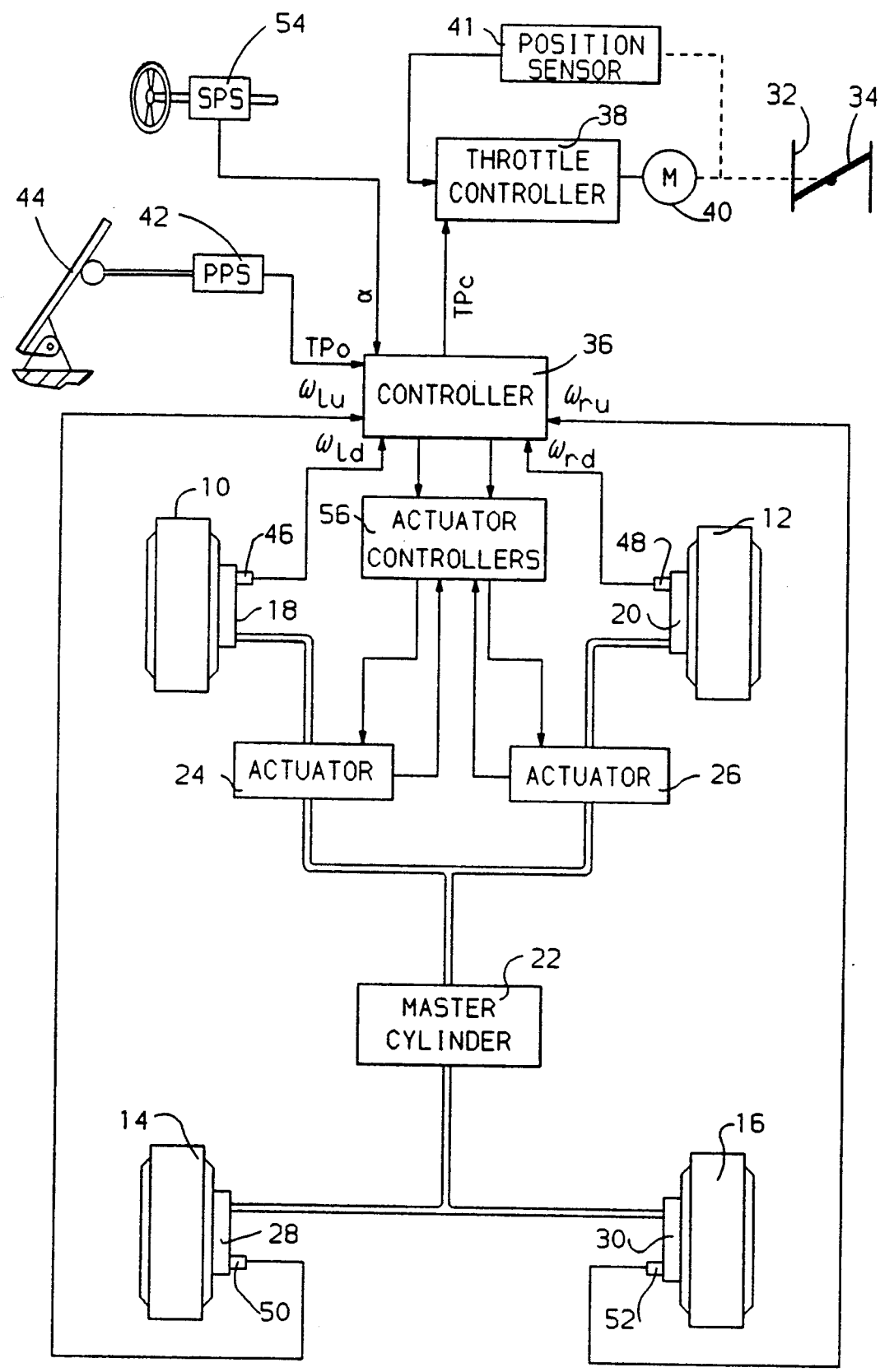
FIG. 1 is a schematic diagram of a vehicle traction control system.

A traction control system for a front wheel drive vehicle is illustrated in FIG. 1. The vehicle has left and right front driven wheels 10 and 12 and left and right non-driven wheels 14 and 16. The front wheels 10 and 12 have respective hydraulic actuated brakes 18 and 20 actuated by manual operation of a conventional master cylinder 22 through a pair of traction control pressure actuators 24 and 26. When the actuators 24 and 26 are inactive, the hydraulic fluid from the master cylinder 22 passes through the actuators 24 and 26 to the brakes 18 and 20 of the wheels 10 and 12. Thus, the actuators 24 and 26 are transparent to the braking system during normal braking of the wheels 10 and 12. The actuators 24 and 26 may each take the form of a motor driven piston for regulating the braking pressure during traction control as illustrated in the U.S. Pat. No. 5,025,882 issued Jun. 25, 1991 and assigned to the assignee of this invention.

The rear wheels 14 and 16 also include a pair of hydraulic actuated brakes 28 and 30 operated by hydraulic fluid under pressure from the master cylinder 22 in response to manual actuation of the brakes.

The vehicle includes an internal combustion engine, not shown, having an air intake passage 32 with a throttle valve 34 therein for regulating engine air intake and therefore engine operation as is well known. The throttle valve 34 is controlled to a commanded throttle position $TP_c$ provided by a controller 36 to a throttle controller 36 which in turn provides closed loop control of the throttle valve 34 via a motor 40 and a conventional throttle position sensor 41, such as a potentiometer monitoring the actual position of the throttle valve 34 and providing a signal representing throttle position. The throttle controller 38 is standard in form and in one embodiment may include a digital-to-analog converter for generating an analog signal representing the commanded throttle position $TP_c$ which is compared with the output of the position sensor 41 to provide control to the motor 40 to position the throttle valve 34 at the commanded position.

During normal operation of the vehicle in the absence of a detected excessive slip condition of the driven wheels 10 and 12, the throttle valve 34 is controlled to an operator commanded position $TP_o$ provided by a pedal position sensor 42 monitoring the position of the standard accelerator pedal 44 operated by the vehicle operator.

If the engine is operated so as to deliver excessive torque to the driven wheels 10 and 12, they will experience excessive slip relative to the road surface thereby reducing the tractive force and the lateral stability of the vehicle. In order to limit the acceleration slip of the driven wheels 10 and 12 resulting from excessive engine output torque, the controller 36 limits slip by operating the brakes of the wheels 10 and 12 and/or by adjusting the commanded position $TP_c$ of the throttle valve 34 to limit the air intake through the intake passage 32. To sense the slip condition of the driven wheels, the controller 36 monitors the wheel speeds $\omega_{ld}$ and $\omega_{rd}$ of the left and right driven wheels 10 and 12 via speed sensors 46 and 48, the wheel speeds $\omega_{lu}$ and $\omega_{ru}$ of the left and right undriven wheels 14 and 16 via wheel speed sensors 50 and 52 and vehicle turning as represented by steering angle $\alpha$ provided by a steering angle position sensor 54. The steering angle sensor 54 may take the form of a conventional potentiometer whose output provides the signal $\alpha$ representing steering angle position. Other embodiments may provide for a yaw rate sensor or other means for sensing vehicle turning. For example, the difference in the speeds of the undriven wheels may be computed for providing an indication of vehicle turning as well as a lateral accelerometer providing a yaw rate signal.

If, based on the input signals, the controller 36 detects an excessive slip condition, the actuators 24 and 26 are operated via actuator controllers 56 for braking the left, right or both of the driven wheels 10 and 12 experiencing an excessive slipping condition in order to arrest the condition. The controller 36 further provides for controlling the engine torque output in response to an excessive slip condition of one or both of the driven wheels 10 and 12 by controlling the position of the throttle valve 34 via the throttle controller 38. In this regard, the controller 36 adjusts the operator commanded throttle position $TP_o$ and provides a commanded throttle position $TP_c$ for reducing or limiting the engine torque output for controlling acceleration slip. This invention provides for enabling the traction control based on the input signal conditions and, accordingly, the control of the driven wheel brakes 18 and 20 and control of the throttle valve 34 for limiting wheel slip may take any form. For example, when traction control is enabled in accord with this invention, the brakes of the driven wheels 10 and 12 may be controlled as depicted in the U.S. Pat. No. 5,025,882 issued on Jun. 25, 1991 and may further include or alternatively include throttle control as also depicted in this patent.

The controller 36 is a microcomputer based controller that has stored therein the instructions necessary to implement the algorithms for acceleration slip control. As seen in FIG. 2, when power is first applied to the system, such as when the vehicle ignition switch is turned to its "On" position, the controller 36 initiates the program at step 58 and then proceeds to step 60 where the controller 36 provides for system initialization. For example, at this step data constants are transferred from read only memory locations to random access memory locations and counters, flags and pointers are initialized.

The routine then proceeds to step 62 where one or more interrupts used in vehicle and engine control, including traction control in accord with this invention are enabled. The interrupt pertaining to the execution of the routine incorporating the principles of this invention is enabled at this step to occur approximately every 100 milliseconds. Upon completion of the interrupt routine(s) the controller proceeds to a background loop at step 66 which is continuously repeated. This loop may include system diagnostic and maintenance routines. The controller interrupts the background loop upon the occurrence of an interrupt to execute the routine called for by the interrupt.

The interrupt routine incorporating this invention is illustrated in FIG. 3 and is entered at step 68. The controller then proceeds to step 70 where the various input signals required for traction control are read and stored in memory. These signals include the wheel speed signals $\omega_{lu}$, $\omega_{ru}$, $\omega_{ld}$, and $\omega_{rd}$, the pedal position $TP_o$, and steering angle $\alpha$.

Next at step 72, a traction control enable routine incorporating the principles of this invention is executed. Step 74 then determines whether or not traction control has been enabled by the routine of step 72. If not enabled indicating an excessive spin condition was not sensed, the program exits at step 76. However, if step 72 enables or has enabled traction control, the program proceeds from the step 74 to step 78 where a left-right coordination routine is executed. This routine provides for the establishment of desired wheel speed and wheel slip values for traction control including adjustment for acceleration on split coefficient of friction surfaces wherein the left and right sides of the vehicle are on road surfaces having different coefficients of friction. Thereafter at step 80, a traction regulation routine is executed wherein the brakes 18 and 20 of the driven wheels 10 and 12 and/or the throttle valve 34 are controlled so as to establish the wheel speed or wheel slip at the values established at step 78. Thereafter, the program exits the interrupt routine 64.

Referring to FIG. 4, there is illustrated the traction control enable routine 72 incorporating the principles of this invention. This routine is repeated in turn for each of the driven wheels 10 and 12. The routine is conditioned initially for one of the driven wheels such as the left driven wheel 10 utilizing and generating parameters associated with that wheel. Thereafter, the routine is repeated for the remaining driven wheel 12 utilizing and generating parameters associated with that wheel.

Figure 5:
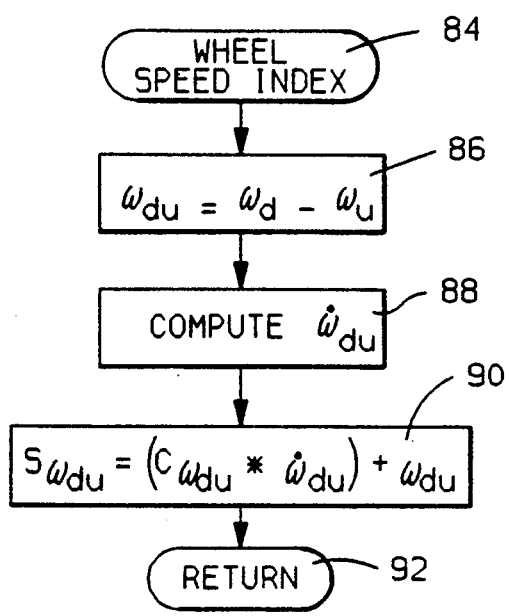

The routine first computes a wheel speed index 82 for the selected wheel. This routine is illustrated in FIG. 5 and is entered at point 84 after which the difference in speed $\omega_{du}$ between the driven wheel $\omega_d$ and the undriven wheel $\omega_u$ on the same side of the vehicle is computed at step 86. For example, assuming the routine of FIG. 4 is conditioned for the left front driven wheel 10, the speed $\omega_{du}$ is computed in accord with the expression $\omega_{ld}-\omega_{lu}$. Conversely, when the routine of FIG. 4 is conditioned for the right front driven wheel 12, the value of $\omega_{du}$ for that wheel is computed in accord with the expression $\omega_{rd}-\omega_{ru}$. The speed of the undriven wheel on the same side of the vehicle is representative of and a measure of the speed of the vehicle at the same side as the corresponding driven wheel. In the case of an anti-lock braking system, the term $\omega_{du}$ may be an estimated vehicle velocity.

Next at step 88 the rate of change of the wheel speed difference value computed at step 86 is determined for the selected wheel. Then at step 90, a wheel speed index $S_{\omega du}$ is computed in accord with the expression $(C_{\omega du}*\dot{\omega}_{du})+\omega_{du}$. The term $C_{\omega du}$ may in one embodiment be a calibration constant stored in read only memory or in another embodiment may be computed as a function of various vehicle parameters including vehicle speed (which may be represented by the average of the undriven wheel speeds $\omega_{lu}$ and $\omega_{ru}$) and the steering angle $\alpha$. As can be seen, the switching index $S_{\omega du}$ for the selected wheel is a predetermined function of the difference in the speed of the selected driven wheel and the speed of the undriven wheel on the same side of the vehicle plus the derivative of the computed difference. From step 90, the wheel speed index routine returns to the routine of FIG. 4 at step 92.

Figure 6:
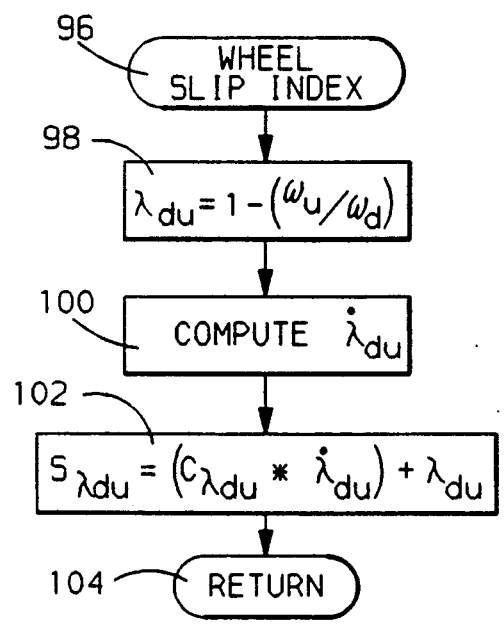

A wheel slip index is next computed at step 94. This routine, illustrated in FIG. 6, is entered at point 96 and proceeds to a step 98 where wheel slip $\lambda_{du}$ for the selected wheel is computed in accord with the expression $1-(\omega_u/\omega_d)$. As can be seen, this expression has a value of zero when there is no slippage of the driven wheel and increases therefrom as wheel slippage increases.

At step 100, the derivative $\dot{\lambda}_{du}$ of the wheel slip is computed for the selected wheel. Thereafter, a wheel slip index $S_{\lambda du}$ is computed at step 102 for the selected wheel in accord with the expression $(C_{\lambda du}*\dot{\lambda}_{du})+\lambda_{du}$. As can be seen, the wheel slip index for the selected wheel is based upon the slip of the selected wheel plus the rate of change of slip of the selected wheel. At step 104, the wheel slip index routine returns to the routine of FIG. 4.

The traction control enable routine next determines at step 106 the various traction control thresholds utilized to determine whether or not to enable or disable traction control. In accord with this invention, at low vehicle speeds, traction control is enabled when the wheel speed index $S_{\omega du}$ exceeds a threshold that is a function of the vehicle turn radius. Conversely, traction control is enabled at high vehicle speeds when the wheel slip index $S_{\lambda du}$ exceeds a threshold that is a function of the vehicle turn radius. Further, the vehicle speed threshold below which traction control is enabled as a function of the wheel speed index and above which traction control is enabled based upon the wheel slip index is itself a function of the vehicle turn radius. Specifically, the vehicle speed threshold below which the wheel speed index is utilized to enable traction control and above which the wheel slip index is utilized to enable traction control increases with an increasing turn radius of the vehicle. Additionally, at the low vehicle speeds wherein the wheel speed index is utilized, the threshold above which traction control is enabled increases with increased steering angle to maximize acceleration due to the fact that the peak coefficient of friction occurs at larger speed difference values while the vehicle is in a turn. Similarly, the wheel slip index utilized at high vehicle speeds is increased with increasing values of vehicle turn angle for the same reason, namely, the peak coefficient of friction occurs at larger wheel slip values while the vehicle is turning.

Figure 7:
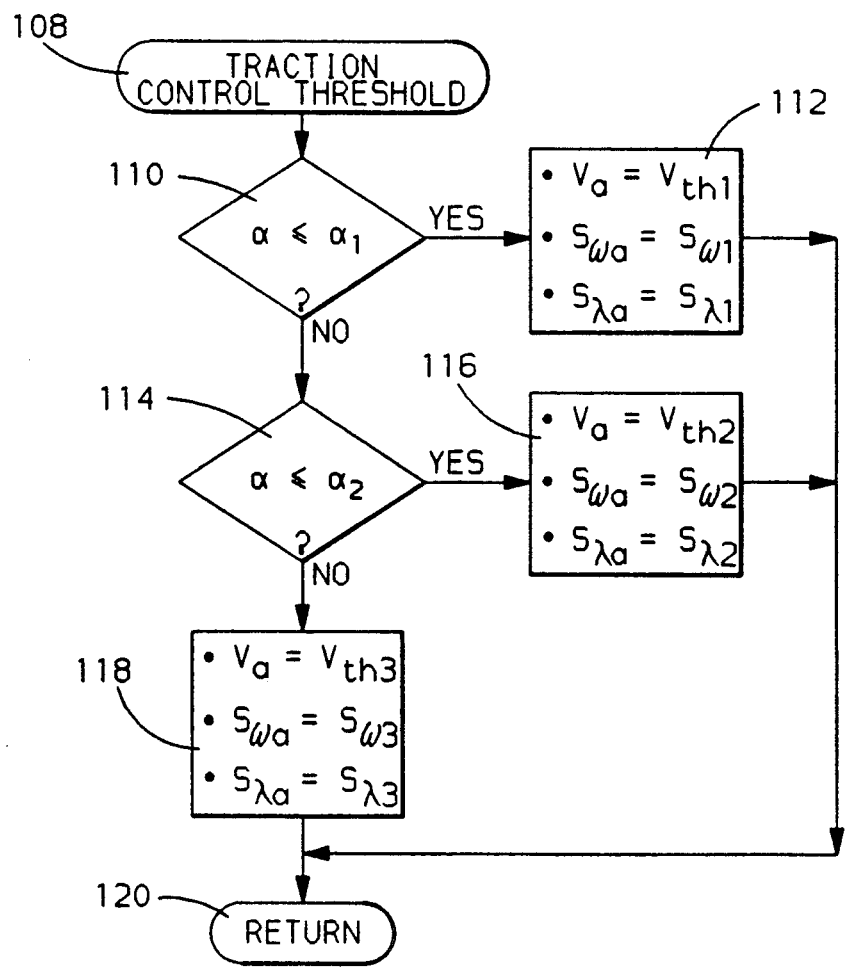

Referring to FIG. 7, the traction control threshold routine 106 for the selected wheel is entered at point 108 after which a step 110 compares the steering angle $\alpha$ with a threshold $\alpha_1$. If the steering angle $\alpha$ is equal to or less than this threshold value, at step 112 a vehicle velocity threshold $V_a$ is set equal to a calibration value $V_{th1}$, a wheel speed switch index threshold $S_{\omega a}$ is set equal to a calibration constant $S_{\omega 1}$ and a wheel slip index threshold $S_{\lambda 1}$ is set equal to a calibration threshold value $S_{\lambda 1}$. Returning to step 110, if the steering wheel angle is greater than $\alpha_1$, the angle is compared at step 114 with a second threshold level $\alpha_2$. If the steering angle sensor $\alpha$ is less than or equal to $\alpha_2$, a step 116 is executed wherein the vehicle velocity threshold $V_a$ is set equal to a calibration constant $V_{th2}$, the wheel speed index $S_{\omega a}$ is set equal to a calibration constant $S_{\omega 2}$ and the wheel slip index threshold $S_{\lambda a}$ is set equal to a calibration constant $S_{\lambda 2}$. Returning to step 114, if the steering angle sensor is greater than $\alpha_2$, a step 118 is executed wherein the vehicle velocity threshold $V_a$ is set equal to the calibration threshold value $V_{th3}$, the wheel speed index threshold $S_{\omega a}$ is set equal to a calibration threshold value $S_{\omega 3}$ and the wheel slip index threshold $S_{\lambda a}$ is set equal to a calibration threshold $S_{\lambda 3}$. When step 112, 116 or 118 establishes the respective velocity and index thresholds, the program returns to the routine of FIG. 4 at step 120.

In general, the vehicle velocity threshold $V_{th2}$ is greater than or equal to the threshold $V_{th1}$, the threshold $V_{th3}$ is greater than or equal to the threshold $V_{th2}$, the wheel speed index thresholds $S_{\omega 1}$, $S_{\omega 2}$ and $S_{\omega 3}$ are progressively increasing values and the wheel slip indexes $S_{\lambda 1}$, $S_{\lambda 2}$ and $S_{\lambda 3}$ are progressively increasing values.

Figure 8:
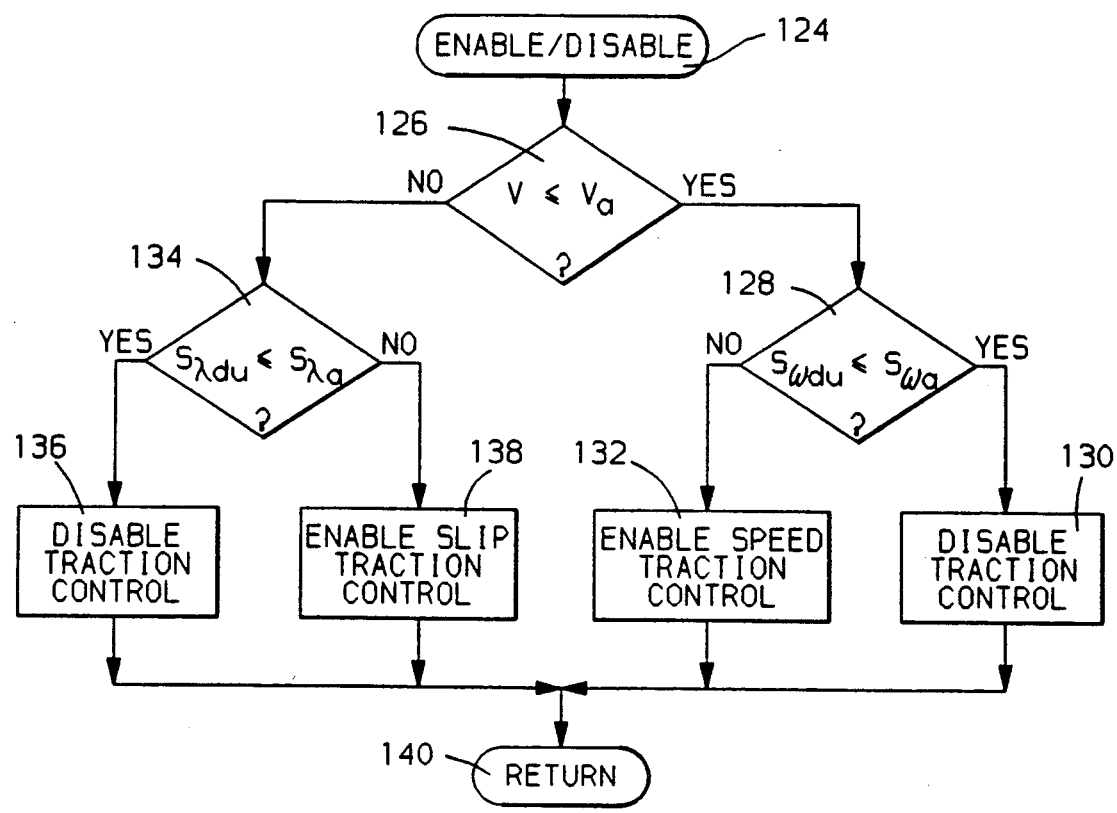

Returning to FIG. 4, when the traction control thresholds for the selected wheel are determined via the traction control threshold routine 106, an enable/disable traction control routine is executed at step 122. In general, the traction control is enabled or disabled based upon the various thresholds established via the routine 106. Referring to FIG. 8, the enable/disable traction control routine is illustrated. This routine is entered at point 124 and proceeds to a step 126 where the vehicle velocity (which may be represented by the average of the undriven wheel speeds $\omega_{lu}$ and $\omega_{ru}$) is compared to the vehicle velocity threshold $V_a$. As previously described, below this threshold, enabling or disabling of the traction control is a function of the wheel speed index $S_{\omega du}$, while above this threshold, traction control is enabled or disabled based upon the wheel slip index $S_{\lambda du}$.

Assuming first that the vehicle speed is equal to or less than the threshold $V_a$ (which is a function of the vehicle turning radius per FIG. 7) the program proceeds to a step 128 where the wheel speed index $S_{\omega du}$ of the selected wheel is compared with the threshold $S_{\omega a}$ (which is a function of the vehicle turning radius per FIG. 7). Assuming that the wheel speed index is less than or equal to the threshold $S_{\omega a}$, the conditions for enabling traction control do not exist and the program proceeds to a step 130 where traction control is disabled. However, if the switching index $S_{\omega du}$ exceeds the threshold $S_{\omega a}$, an excessive slip condition exists and the program proceeds to a step 132 where the traction control is enabled to control the speed of the selected driven wheel to provide for traction control.

Returning to step 126, if the vehicle speed is greater than the threshold $V_a$, the wheel slip index $S_{\lambda du}$ is compared to the slip index threshold $S_{\lambda a}$ at step 134. If the slip index is less than or equal to the threshold $S_{\lambda a}$, traction control is not required and is therefore disabled at step 136. However, if the wheel slip index exceeds the threshold $S_{\lambda a}$, the program proceeds to a step 138 where the traction control is enabled to control the slip of the selected wheel to provide for traction control.

From the step 130, 132, 136 or 138, the enable/disable routine 124 returns to the traction control enable routine of FIG. 4 at step 140. If the routine has been executed for each of the driven wheels 10 and 12, the program returns to the interrupt routine of FIG. 3 at step 142. If not, the routine is conditioned for the other wheel and then repeated using and generating parameters associated with that wheel.

In accord with the foregoing traction control enable routine, the system is made adaptable to straight line and curved motions of the vehicle. As such, the system provides for desirable launch characteristics both while the vehicle is in straight line motion and while the vehicle is traveling in a curved path.

Figure 9:
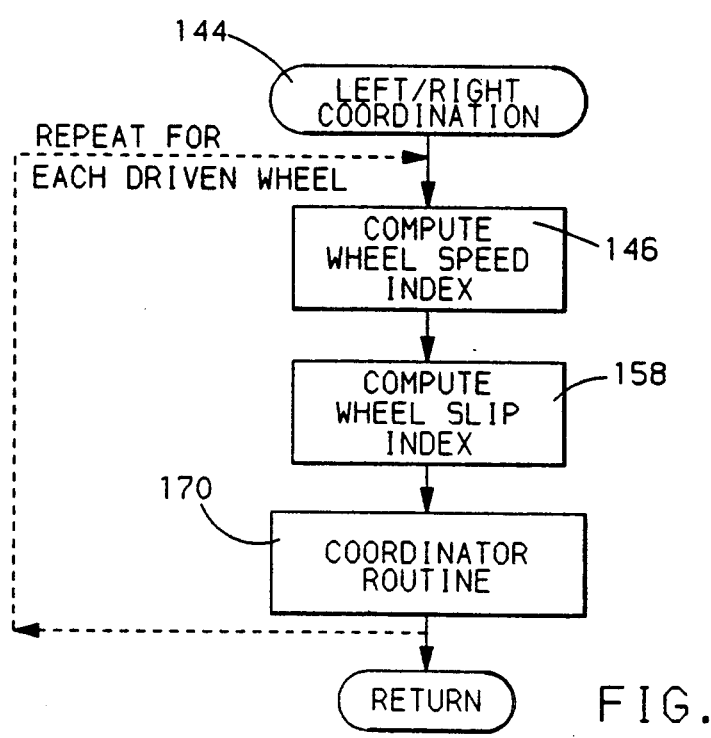

Returning to FIG. 3, assuming that step 74 determines that traction control was enabled by the traction control enable routine 72, the left-right coordination routine 78 incorporating the principles of this invention and as illustrated in FIG. 9 is executed. As seen in FIG. 9, the routine is entered at point 144. As with the traction control enable routine 72, this routine is first conditioned for one of the driven wheels such as the driven wheel 10 utilizing and generating parameters associated with this wheel after which the routine is repeated for the other driven wheel utilizing and generating parameters associated with that wheel.

Figure 10:
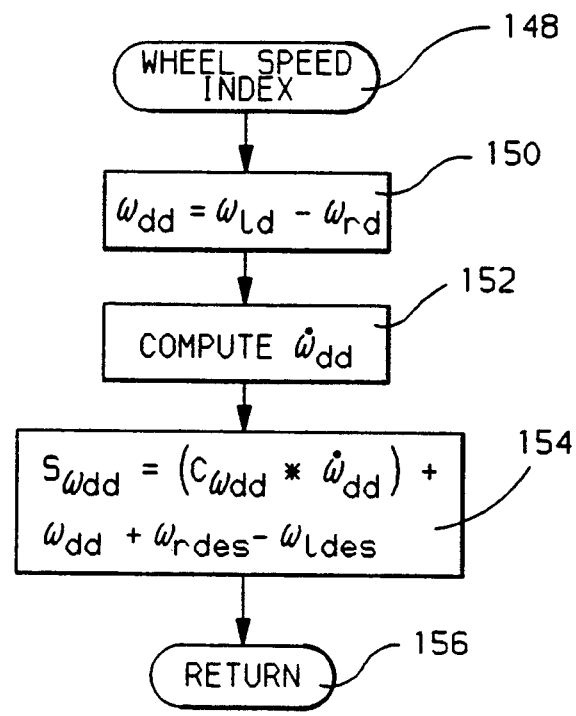

The routine first computes a wheel speed index at 146 as illustrated in FIG. 10. This routine is entered at point 148 of FIG. 10 after which a difference speed $\omega_{dd}$ between the two driven wheels is computed at step 150 by subtracting the speed $\omega_{rd}$ of the right driven wheel 12 from the speed $\omega_{ld}$ of the left driven wheel 10. Step 152 next computes the rate of change in the difference wheel speed value $\omega_{dd}$. Thereafter a wheel speed index $S_{\omega dd}$ is computed at step 154 in accord with the expression $(C_{\omega dd} * \dot{\omega}_{dd}) + \omega_{dd} + \omega_{rdes} - \omega_{ldes}$ where $C_{\omega dd}$ is a calibration constant stored in read only memory or, alternatively, may be a value computed from various vehicle parameters including vehicle speed and steering angle. $\omega_{rdes}$ and $\omega_{ldes}$ are wheel speed values computed as will be described. Thereafter, the wheel speed index routine returns to the left-right coordination routine of FIG. 9 at step 156.

Figure 11:
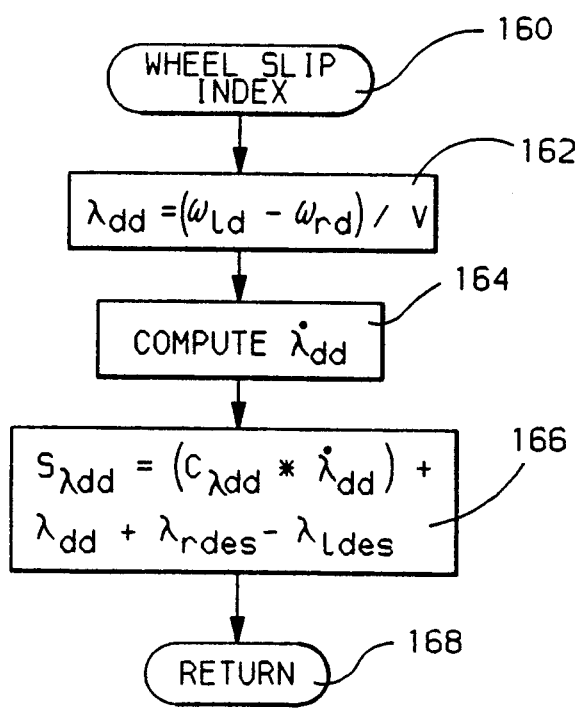

Returning to FIG. 9, the routine next computes an index based on a vehicle speed normalized difference speed, hereafter referred to as a wheel slip index, at step 158. This routine is illustrated in FIG. 11 and is entered at point 160 after which a vehicle speed normalized wheel slip term $\lambda_{dd}$ is computed in accord with the expression $(\omega_{ld} - \omega_{rd})/V$. In another embodiment, the term V can be the larger or the average of the driven wheel speeds.

Step 164 next computes the rate of change in the wheel slip term $\lambda_{dd}$ after which step 166 computes a wheel slip index value $S_{\lambda dd}$ in accord with the expression $(C_{\lambda dd} * \dot{\lambda}_{dd}) + \lambda_{dd} + \lambda_{rdes} - \lambda_{ldes}$ where $C_{\lambda dd}$ is a calibration constant stored in read only memory or alternatively is a value computed as a function of various vehicle parameters such as vehicle speed and vehicle turn radius. $\lambda_{ldes}$ and $\lambda_{rdes}$ are wheel slip values computed as will be described. From step 166, the program returns to the left-right coordination routine of FIG. 9 via step 168.

The left-right coordination routine of FIG. 9 next executes a coordinator routine that provides compensation for a yaw condition that may result from the wheels on the left and right side of the vehicle traveling over surfaces having different coefficient of friction values. The result of this yaw condition is a force imbalance between the left and right driven wheels. The coordinator routine 170 provides for an adjustment of the target wheel slip or wheel speed of the wheel on the highest coefficient of friction surface to minimize the force imbalance between the right and left sides of the vehicle tending to produce the yaw moment on the vehicle.

Figure 12:
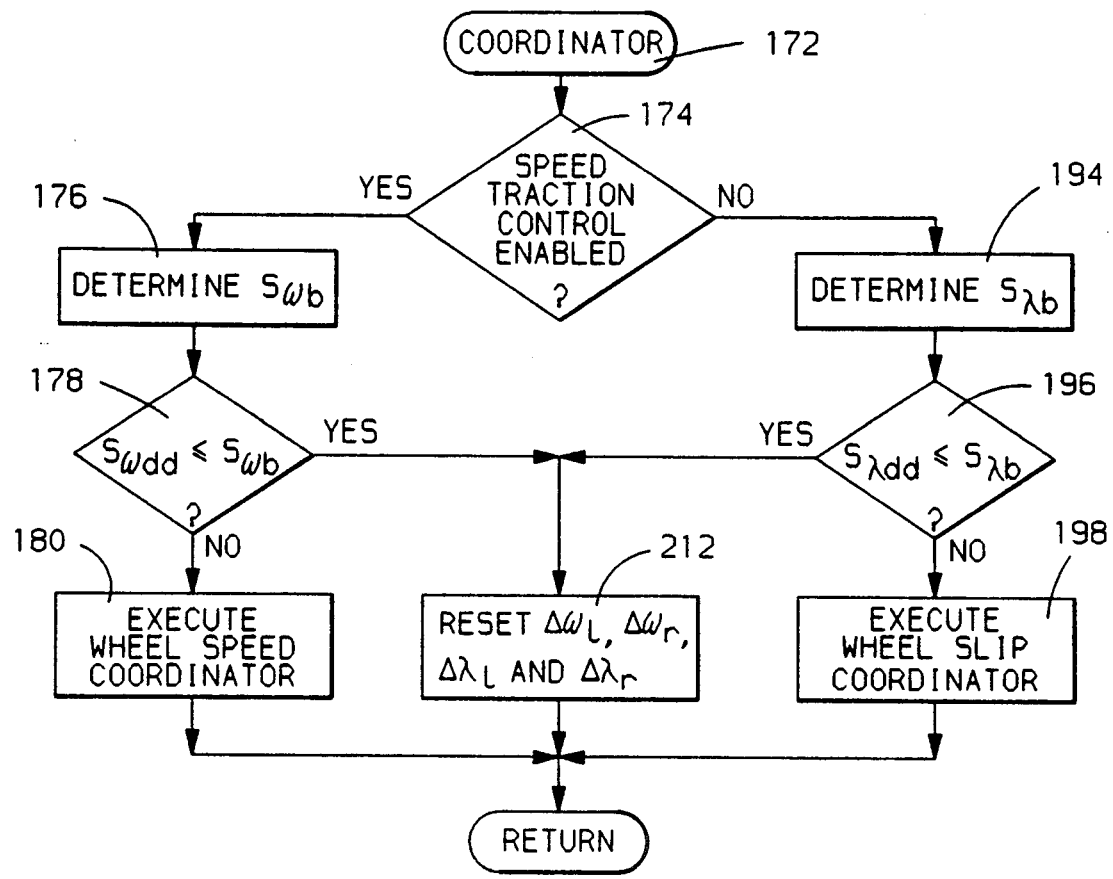

The coordinator routine is illustrated in FIG. 12. This routine is entered at point 172 and proceeds to a step 174 where the routine determines whether or not the traction control has been enabled to control the speed of the selected wheel via the traction control enable routine 72. It will be recalled the speed traction control is enabled only when the vehicle speed is less than or equal to the threshold $V_a$ which is a function of the turning radius of the vehicle. Therefore, step 174 in essence is determining if the vehicle speed is less than or equal to the speed threshold $V_a$. Based on this threshold, the routine will determine activation of split coefficient coordination based on using either a wheel speed index threshold $S_{\omega b}$ or a wheel slip index threshold $S_{\lambda b}$. If step 174 indicates that speed traction control has been enabled for the selected wheel (vehicle speed less than or equal to $V_a$, a step 176 is executed to determine the wheel speed index threshold $S_{\omega b}$. In one embodiment the value of $S_{\omega b}$ may be a calibration constant stored in read only memory or can be a calibrated value dependent upon vehicle parameters such as vehicle speed and vehicle acceleration. For example, the value of $S_{\omega b}$ can be the sum of one component that decreases with increasing vehicle speed and another component that increases from zero with increasing vehicle acceleration from a certain acceleration level.

Figure 13:
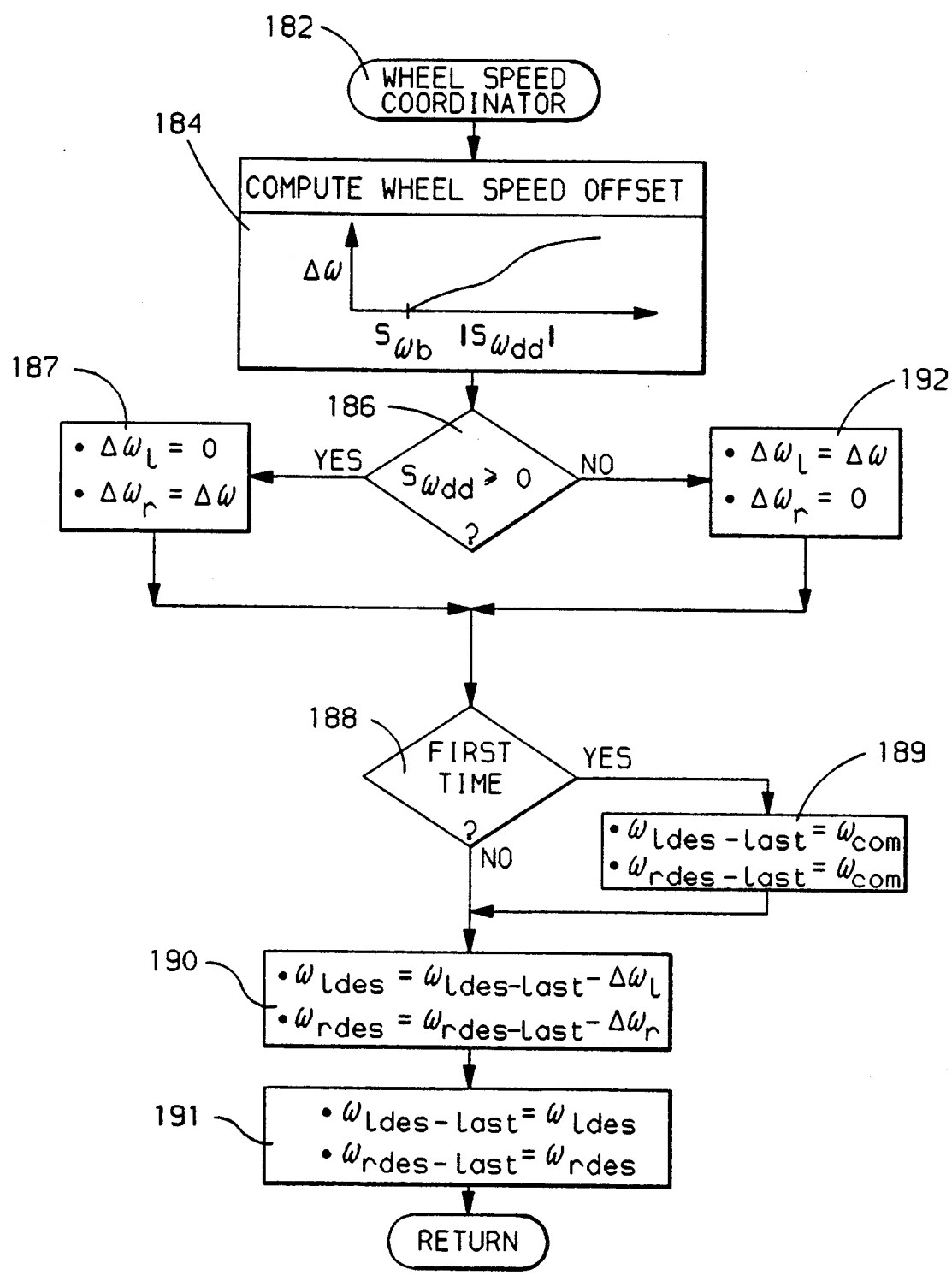

The routine next compares the wheel speed index value $S_{\omega dd}$ determined by the routine of FIG. 10 with the threshold $S_{\omega b}$ at step 178. Assuming first that the wheel speed index $S_{\omega dd}$ is greater than the threshold $S_{\omega b}$ indicating a yaw condition requiring adjustment of the target wheel speed of the wheel on the high coefficient of friction surface in order to reduce the yaw forces, the program proceeds to a step 180 where a wheel speed coordinator routine is executed. This routine illustrated in FIG. 13 is entered at point 182 and proceeds to a step 184 where a wheel speed offset value $\Delta \omega$ is retrieved from a lookup table stored in read only memory as a function of the absolute magnitude of the wheel speed index $S_{\omega dd}$. In general, the wheel speed offset has a value of 0 when the wheel speed index $S_{\omega dd}$ is equal to or less than the threshold $S_{\omega b}$ and increases therefrom with increasing values of $S_{\omega dd}$. Thereafter at step 186 the routine determines which wheel is on the high coefficient of friction surface. If the wheel speed index $S_{\omega dd}$ is greater than or equal to 0, the right wheel 12 is on the high coefficient of friction surface so that its target velocity should be decreased in order to equalize the forces acting on the left and right sides of the vehicle. Accordingly, at step 187, an offset value $\Delta \omega_l$ for the left driven wheel 10 is reset to 0 and an offset value $\Delta \omega_r$ for the right wheel (which is on the high coefficient of friction surface) is set equal to the offset value $\Delta \omega$ determined at step 184.

At step 188, the routine determines if the wheel speed coordinator routine 180 is being executed for the first time since step 178 determined a yaw condition requiring adjustment of the target speed of the wheel on the high coefficient of friction surface. If so, a last determined value $\omega_{ldes-last}$ of the desired left wheel target speed $\omega_{ldes}$ and a last determined value $\omega_{rdes-last}$ of the desired right wheel target speed $\omega_{rdes}$ are initialized to a commanded wheel speed $\omega_{com}$. In one embodiment, the commanded wheel speed $\omega_{com}$ may be a constant speed added to the vehicle speed which in turn is the average of the undriven wheel speeds. In another embodiment the speed added to vehicle speed may be made a function of vehicle speed and steering angle.

Following step 189 or if step 188 determines the initialization procedure of step 189 had previously been executed, a step 190 is executed at which the desired target speed $\omega_{ldes}$ of the left driven wheel 10 is set equal to the last value $\omega_{ldes\text{-}last}$ of the left wheel desired target speed minus the offset value $\Delta\omega_l$ (which was set to 0 at step 188). Similarly, the desired right wheel speed $\omega_{rdes}$ is set equal to the last value $\omega_{rdes\text{-}last}$ of the desired right wheel target speed minus the offset value $\Delta\omega_r$. In this manner, the commanded right wheel speed on the high coefficient of friction surface is reduced by the offset amount in order to reduce the imbalance between the forces acting on the right and left sides of the vehicle. Thereafter the value $\omega_{ldes\text{-}last}$ to be used at step 190 during the next execution of the wheel speed coordinator routine is set to the just determined value of $\omega_{ldes}$ and the value $\omega_{rdes\text{-}last}$ to be used at step 190 during the next execution of the wheel speed coordinator routine is set to the just determined value of $\omega_{rdes}$.

By the repeated execution of steps 190 and 191 in response to steps 186 and 187 determining that the right driven wheel is on the high coefficient of friction surface, the right wheel speed will be continually reduced until the wheel speed index value becomes less than the threshold $S_{\omega b}$ in response to operation of the traction regulation routine 80 at which time the wheel speed coordinator routine 180 is bypassed.

Returning to step 186, if the switching index $S_{\omega dd}$ is less than 0, the left wheel 10 is on the high coefficient of friction surface so that its target velocity should be decreased in order to equalize the forces acting on the left and right sides of the vehicle. When this condition is sensed, a step 192 sets the left wheel offset value $\Delta\omega_l$ equal to the offset value $\Delta\omega$ determined at step 184 and sets the right wheel offset $\Delta\omega_r$ equal to 0. Thereafter, steps 188–191 operate as described above to reduce the desired target speed $\omega_{ldes}$ of the left driven wheel while the desired target speed $\omega_{rdes}$ of the right driven wheel is maintained at the commanded speed $\omega_{com}$ ($\Delta\omega_r$ being equal to zero).

By the repeated execution of steps 190 and 191 in response to steps 186 and 192 determining that the left driven wheel is on the high coefficient of friction surface, the left wheel speed will be continually reduced until the wheel speed index value becomes less than the threshold $S_{\omega b}$ in response to operation of the traction regulation routine 80 at which time the wheel speed coordinator routine 180 is bypassed.

From step 191, the program returns to the coordinator routine of FIG. 12. Returning to step 174 of this FIGURE, if speed traction control has not been enabled indicating that slip traction control has been enabled by the traction control enable routine 72, the program proceeds to a step 194 where a wheel slip index threshold $S_{\lambda b}$ is determined. As with the step 176, this value may be a calibration constant stored in ROM or in another embodiment may be determined based on vehicle speed and vehicle acceleration. In one embodiment, the slip index threshold may be the sum of one component that decreases with increasing vehicle speed and another component that increases from zero with vehicle acceleration from a certain level.

Figure 14:
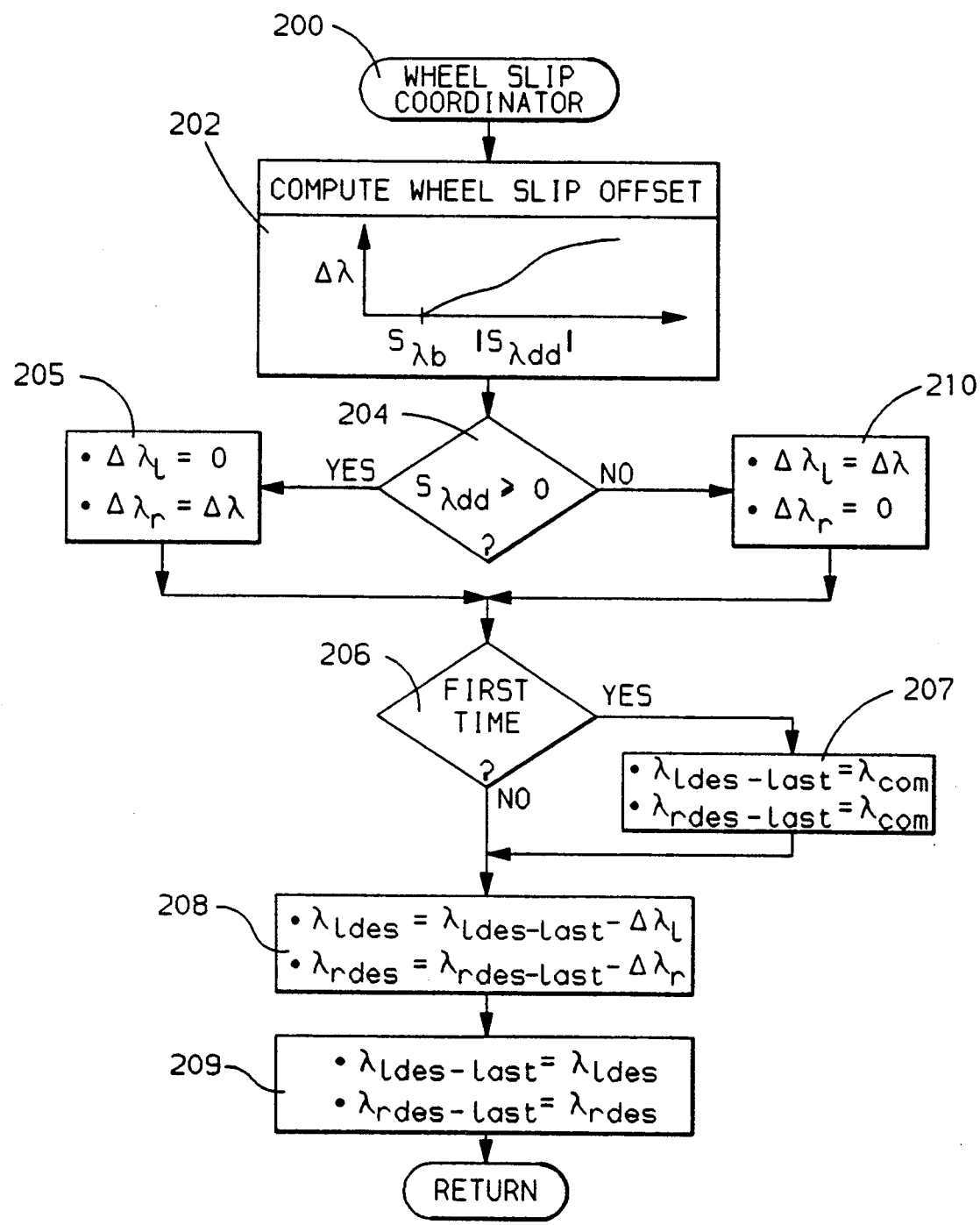

The routine next compares the wheel slip index value $S_{\lambda dd}$ determined by the routine of FIG. 10 with the threshold $S_{\lambda b}$ at step 196. Assuming first that the wheel slip index $S_{\lambda dd}$ is greater than the threshold $S_{\lambda b}$ indicating a yaw condition requiring adjustment of the target wheel slip of the wheel on the high coefficient of friction surface in order to reduce the yaw forces, the program proceeds to a step 198 where a wheel slip coordinator routine is executed. This routine illustrated in FIG. 14 is entered at point 200 and proceeds to a step 202 where a wheel slip offset value $\Delta\lambda$ is retrieved from a lookup table stored in read only memory as a function of the absolute magnitude of the wheel slip index $S_{\lambda dd}$. In general, the wheel slip offset has a value of 0 when the wheel slip index $S_{\lambda dd}$ is equal to or less than the threshold $S_{\lambda b}$ and increases therefrom with increasing values of $S_{\lambda dd}$. Thereafter at step 204 the routine determines which wheel is on the high coefficient of friction surface. If the wheel slip index $S_{\lambda dd}$ is greater than or equal to 0, the right wheel 12 is on the high coefficient of friction surface so that its target velocity should be decreased in order to equalize the forces acting on the left and right sides of the vehicle. Accordingly, at step 205, an offset value $\Delta\lambda_l$ for the left driven wheel 10 is reset to 0 and an offset value $\Delta\lambda_r$ for the right wheel (which is on the high coefficient of friction surface) is set equal to the offset value $\Delta\lambda$ determined at step 202.

At step 206, the routine determines if the wheel slip coordinator routine 198 is being executed for the first time since step 196 determined a yaw condition requiring adjustment of the target slip of the wheel on the high coefficient of friction surface. If so, a last determined value $\lambda_{ldes\text{-}last}$ of the desired left wheel target slip $\lambda_{ldes}$ and a last determined value $\lambda_{rdes\text{-}last}$ of the desired right wheel target slip $\lambda_{rdes}$ are initialized to a commanded wheel slip $\lambda_{com}$.

Following step 207 or if step 206 determines the initialization procedure of step 207 had previously been executed, a step 208 is executed at which the desired target slip $\lambda_{ldes}$ of the left driven wheel 10 is set equal to the last value $\lambda_{ldes\text{-}last}$ of the left wheel desired target slip minus the offset value $\Delta\lambda_l$ (which was set to 0 at step 205). Similarly, the desired right wheel slip $\lambda_{rdes}$ is set equal to the last value $\lambda_{rdes\text{-}last}$ of the desired right wheel target slip minus the offset value $\Delta\lambda_r$. In this manner, the commanded right wheel slip on the high coefficient of friction surface is reduced by the offset amount in order to reduce the imbalance between the forces acting on the right and left sides of the vehicle. Thereafter at step 209 the value $\lambda_{ldes\text{-}last}$ to be used at step 208 during the next execution of the wheel slip coordinator routine is set to the just determined value of $\lambda_{ldes}$ and the value $\lambda_{rdes\text{-}last}$ to be used at step 208 during the next execution of the wheel slip coordinator routine is set to the just determined value of $\lambda_{rdes}$.

By the repeated execution of steps 208 and 209 in response to steps 204 and 205 determining that the right driven wheel is on the high coefficient of friction surface, the right wheel slip will be continually reduced until the wheel slip index value $S_{\lambda dd}$ becomes less than the threshold $S_{\lambda b}$ in response to operation of the traction regulation routine 80 at which time the wheel slip coordinator routine 198 is bypassed.

Returning to step 204, if the switching index $S_{\lambda dd}$ is less than 0, the left wheel 10 is on the high coefficient of friction surface so that its target slip should be decreased in order to equalize the forces acting on the left and right sides of the vehicle. When this condition is sensed, a step 210 sets the left wheel slip offset value $\Delta\lambda_l$ equal to the offset value $\Delta\lambda$ determined at step 202 and sets the right wheel offset $\Delta\lambda_r$ equal to 0. Thereafter, steps 206-209 operate as described above to reduce the desired target slip $\lambda_{ldes}$ of the left driven wheel while the desired target slip $\lambda_{rdes}$ of the right driven wheel is maintained at the commanded slip $\lambda_{com}$ ($\Delta\lambda_r$ being equal to zero).

By the repeated execution of steps 208 and 209 in response to steps 204 and 210 determining that the left driven wheel is on the high coefficient of friction surface, the left wheel slip will be continually reduced until the wheel slip index value becomes less than the threshold $S_{\lambda b}$ in response to operation of the traction regulation routine 80 at which time the wheel slip coordinator routine 198 is bypassed.

Returning to the coordinator routine of FIG. 12, if step 178 determines that the wheel speed index $S_{\omega dd}$ is less than the threshold $S_{\omega b}$ or if step 196 determines that the wheel slip index $S_{\lambda dd}$ is less than or equal to the threshold $S_{\lambda b}$, the yaw moments on the vehicle are in a comfortable range for the operator to handle such that the program proceeds from either of those steps to a step 212 where the wheel speed and slip offset values $\Delta\omega_l$, $\Delta\omega_r$, $\Delta\lambda_l$ and $\Delta\lambda_r$ are reset to 0 and the desired target speed or slip value for each of the wheels is set to the respective values $\omega_{ldes}$, $\omega_{rdes}$, $\lambda_{ldes}$, and $\lambda_{rdes}$ depending upon whether speed or slip traction control has been enabled. The routine of FIG. 12 then returns to the interrupt routine of FIG. 3 after which the traction regulation routine 80 is executed.

Figure 15:
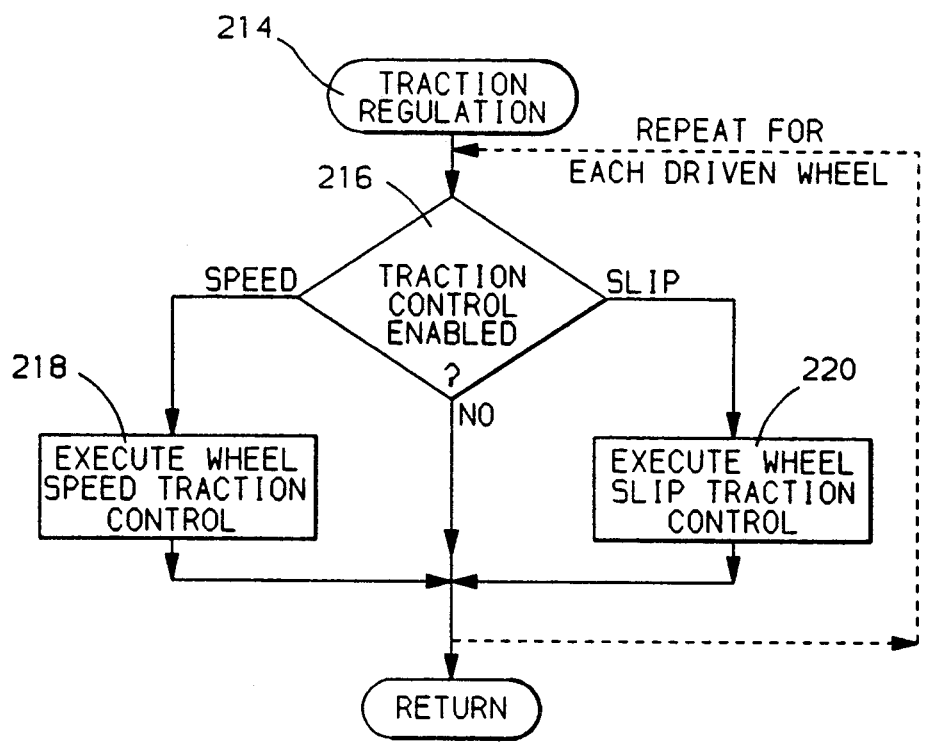

The traction regulation routine is illustrated in FIG. 15 and is entered at point 214. The routine is repeated in turn for each of the driven wheels 10 and 12. The routine is first conditioned for one of the driven wheels such as the wheel 10 wherein the wheel is controlled based on the parameters associated with that wheel. Thereafter, the routine is repeated for the other driven wheel using parameters associated with that wheel.

The routine first proceeds to determine whether traction control was enabled and if enabled whether it was enabled for speed control or slip control. If speed traction control was enabled by the enable/disable routine of FIG. 8, the program proceeds to execute a wheel speed traction control routine at step 218. This routine may take any conventional closed loop control of wheel speed wherein speed is controlled to the desired target wheel speed established at step 190 of FIG. 13. In one embodiment, the current to the motor in the appropriate actuator 24 or 26 is controlled based upon an error index that is a function of the error between the actual wheel speed and the desired wheel speed summed with a rate of change in the error. In another embodiment, the current to the motor of the actuator 24 or 26 may be controlled based on conventional proportional and integral control from a comparison of the actual wheel speed and the desired wheel speed.

Returning to step 216, if it is determined that wheel slip traction control was enabled by step 138 of FIG. 8, the program proceeds to a step 220 where a wheel slip traction control routine is executed for establishing the actual wheel slip value at the desired target wheel slip value established by step 208 of FIG. 14. In one embodiment, the current to the motor in the appropriate actuator 24 or 26 is controlled based upon an error index that is a function of the wheel slip error and the rate of change of wheel slip error. In another embodiment, the motor current may be based upon proportional and integral control terms derived from the error between the actual wheel slip and the desired wheel slip.

If step 216 determines that traction control has not been enabled, steps 218 and 220 are bypassed. When the routine has been executed for each wheel to establish the wheel speed or wheel slip at the desired value, the program returns to the interrupt routine of FIG. 3.

While a specific preferred embodiment has been described, it is understood that many modifications may be made by the exercise of skill in the art without departing from the scope of the invention.

The embodiments of the invention in which an exclusive property or privilege is claimed are defined as follows:

1. A method of controlling slip between a wheel of a vehicle and a road surface, the method comprising the steps of:
   sensing wheel speed;
   sensing vehicle speed;
   sensing vehicle turn radius;
   determining a wheel speed index value that is a predetermined function of the difference between the sensed wheel speed and the sensed vehicle speed;
   determining a wheel slip index value that is a predetermined function of the ratio of the sensed vehicle speed and the sensed wheel speed;
   determining a speed enable threshold that is a predetermined function of the sensed vehicle turn radius;
   determining a slip enable threshold that is a predetermined function of the sensed vehicle turn radius; and
   controlling wheel slip (A) when the sensed vehicle speed is less than a vehicle speed threshold and the wheel speed index value is greater than the speed enable threshold and (B) when the sensed vehicle speed is greater than the vehicle speed threshold and the wheel slip index is greater than the slip enable threshold.

2. The method of claim 1 wherein the vehicle speed threshold is a predetermined function of the vehicle turn radius.

3. A method of controlling slip between a wheel of a vehicle and a road surface, the method comprising the steps of:
   sensing wheel speed $\omega_d$;
   sensing vehicle speed $\omega_u$;
   sensing vehicle turn radius $\alpha$;
   determining a wheel speed index value $S_{\omega du}$ in accord with the expression $(C_{\omega du}*\dot{\omega}_{du})+\omega_{du}$, where $C_{\omega du}$ is a calibration constant, $\omega_{du}$ is the difference between $\omega_d$ and $\omega_u$, and $\dot{\omega}_{du}$ is the rate of change in $\omega_{du}$;
   determining a wheel slip index value $S_{\lambda du}$ in accord with the expression $(C_{\lambda du}*\dot{\lambda}_{du})+\lambda_{du}$, where $C_{\lambda du}$ is a calibration constant, $\lambda_{du}$ is equal to $1-(\omega_u/\omega_d)$, and $\dot{\lambda}_{du}$ is the rate of change in $\lambda_{du}$;
   determining a speed enable threshold that is a predetermined function of $\alpha$;
   determining a slip enable threshold that is a predetermined function of $\alpha$;
   determining a vehicle speed threshold that is a predetermined function of $\alpha$; and
   controlling wheel slip (A) when the sensed vehicle speed is less than a vehicle speed threshold and $S_{\omega du}$ is greater than the speed enable threshold and (B) when the sensed vehicle speed is greater than the vehicle speed threshold and $\lambda_{du}$ is greater than the slip enable threshold.

4. A traction control method for a vehicle having left and right side driven wheels, left and right side undriven wheels, and an engine for applying driving torque to the left and right side driven wheels, the method comprising, for each right and left side of the vehicle, the steps of:

determining the driven wheel speed $\omega_u$;

determining the undriven wheel speed $\omega_d$;

determining vehicle speed V;

determining vehicle turn radius $\alpha$;

determining a difference speed $\omega_{du}$ between the determined wheel speeds $\omega_u$ and $\omega_d$;

determining a wheel speed index value $S_{\omega du}$ that is a predetermined function of the difference speed $\omega_{du}$;

determining a wheel slip index value $S_{\lambda du}$ that is a predetermined function of the ratio of the wheel speeds $\omega_u$ and $\omega_d$;

determining a speed enable threshold that is a predetermined function of the determined vehicle turn radius $\alpha$;

determining a slip enable threshold that is a predetermined function of the determined vehicle turn radius $\alpha$; and limiting the applied driving torque to the driven wheel to limit acceleration slip (A) when the determined vehicle speed V is less than a vehicle speed threshold and the wheel speed index value $S_{\omega du}$ is greater than the speed enable threshold and (B) when the sensed vehicle speed is greater than the vehicle speed threshold and the wheel slip index value $S_{\lambda d}$ is greater than the slip enable threshold.

5. The method of claim 4 wherein the vehicle speed threshold is a predetermined function of the determined vehicle turn radius $\alpha$.

6. The method of claim 5 wherein the predetermined function of the difference speed is defined by the expression $(C_{\omega du} * \dot{\omega}_{du}) + \omega_{du}$, where $C_{\omega du}$ is a calibration constant and $\dot{\omega}_{du}$ is the rate of change in $\omega_{du}$, and the predetermined function of the ratio of the wheel speeds $\omega_u$ and $\omega_d$ is defined by the expression $(C_{\lambda du} * \dot{\lambda}_{du}) + \lambda_{du}$, where $C_{\lambda du}$ is a calibration constant, $\lambda_{du}$ is equal to $1-(\omega_u/\omega_d)$, and $\dot{\lambda}_{du}$ is the rate of change in $\lambda_{du}$.

* * * * *